United States Patent
Biland et al.

(10) Patent No.: US 11,760,677 B2
(45) Date of Patent: Sep. 19, 2023

(54) APPARATUS AND PROCESS FOR PRODUCING FIBER FROM IGNEOUS ROCK

(71) Applicant: USB I, LLC, Richmond, TX (US)

(72) Inventors: Oleksandr Biland, The Woodlands, TX (US); Robert Bruce Ferguson, Sr., Richmond, TX (US)

(73) Assignee: USB I, LLC, Richmond, TX (US)

( * ) Notice: Subject to any disclaimer, the term of this patent is extended or adjusted under 35 U.S.C. 154(b) by 339 days.

(21) Appl. No.: 17/083,081

(22) Filed: Oct. 28, 2020

(65) Prior Publication Data

US 2021/0053856 A1 Feb. 25, 2021

Related U.S. Application Data

(62) Division of application No. 15/624,305, filed on Jun. 15, 2017, now Pat. No. 10,858,275.

(60) Provisional application No. 62/350,832, filed on Jun. 16, 2016.

(51) Int. Cl.

| | |
|---|---|
| *C03C 13/06* | (2006.01) |
| *C03B 37/09* | (2006.01) |
| *C03B 7/07* | (2006.01) |
| *C03B 37/083* | (2006.01) |
| *C03B 5/02* | (2006.01) |
| *C03B 5/23* | (2006.01) |
| *C03B 3/02* | (2006.01) |
| *C03B 7/14* | (2006.01) |

(Continued)

(52) U.S. Cl.
CPC .............. *C03B 5/021* (2013.01); *C03B 3/023* (2013.01); *C03B 3/026* (2013.01); *C03B 5/23* (2013.01); *C03B 7/07* (2013.01); *C03B 7/14* (2013.01); *C03B 37/0203* (2013.01); *C03B 37/07* (2013.01); *C03B 37/09* (2013.01); *C03C 13/06* (2013.01); *C03B 37/083* (2013.01); *C03B 2205/90* (2013.01); *C03B 2211/70* (2013.01); *Y02P 40/57* (2015.11)

(58) Field of Classification Search
CPC ........................... C03B 2211/70; C03C 13/06
See application file for complete search history.

(56) References Cited

U.S. PATENT DOCUMENTS

| | | | |
|---|---|---|---|
| 2,485,851 A | * | 10/1949 | Stevens .................. C03B 5/021 65/495 |
| 3,895,896 A | | 7/1975 | White et al. |
| 3,997,313 A | | 12/1976 | Alexander |

(Continued)

FOREIGN PATENT DOCUMENTS

| | | |
|---|---|---|
| CN | 1513782 A | 7/2004 |
| CN | 202543025 U | 11/2012 |

(Continued)

OTHER PUBLICATIONS

KR-2006104780-A (Bang) Oct. 9, 2006 (English language translation). [retrieved May 19, 2023] Retrieved from: Clarivate Analytics. (Year: 2006).*

(Continued)

*Primary Examiner* — Erin Snelting
(74) *Attorney, Agent, or Firm* — Vinson & Elkins L.L.P.

(57) ABSTRACT

Methods and apparatus for producing fibers from igneous rock, including basalt include heating igneous rock by electrical conductive coils to achieve an homogenous melt and forming homogenous fibers from the melt.

19 Claims, 6 Drawing Sheets

(51) Int. Cl.
*C03B 37/07* (2006.01)
*C03B 37/02* (2006.01)

(56) References Cited

U.S. PATENT DOCUMENTS

| | | |
|---|---|---|
| 4,026,689 A | 5/1977 | Higginbotham |
| 4,194,873 A | 3/1980 | Killmeyer |
| 4,289,465 A | 9/1981 | Killmeyer et al. |
| 4,296,060 A | 10/1981 | Killmeyer et al. |
| 4,471,488 A | 9/1984 | Reboux |
| 4,720,295 A | 1/1988 | Bronshstein |
| 4,752,513 A | 6/1988 | Rau et al. |
| 4,780,121 A * | 10/1988 | Matesa ............ C03B 5/12 65/135.1 |
| 4,938,823 A | 7/1990 | Balazek et al. |
| 6,125,660 A | 10/2000 | Gorobinskaya et al. |
| 6,235,082 B1 | 5/2001 | Kepplinger et al. |
| 6,588,234 B1 | 7/2003 | Kiefer et al. |
| 6,647,747 B1 * | 11/2003 | Brik ............ C03B 37/0213 65/540 |
| 6,800,164 B2 | 10/2004 | Brandstrom |
| 6,893,524 B2 | 5/2005 | Green |
| 7,530,240 B2 | 5/2009 | Kibol |
| 8,037,719 B2 | 10/2011 | Kamiya et al. |
| 8,042,362 B2 | 10/2011 | Kibol et al. |
| 8,123,887 B2 | 2/2012 | Green |
| 8,347,655 B2 | 1/2013 | Leister et al. |
| 8,414,807 B2 | 4/2013 | Kibol et al. |
| 8,806,900 B2 | 8/2014 | Brik |
| 8,910,690 B2 | 12/2014 | Tashiro et al. |
| 9,771,294 B1 | 9/2017 | Zubko et al. |
| 10,858,275 B2 | 12/2020 | Biland et al. |
| 2005/0005646 A1 | 1/2005 | Leister et al. |
| 2005/0083989 A1 | 4/2005 | Leister et al. |
| 2005/0103058 A1 | 5/2005 | Gogoladze et al. |
| 2005/0223752 A1 | 10/2005 | Kibol |
| 2006/0218972 A1 | 10/2006 | Brik |
| 2007/0000721 A1 | 1/2007 | Kamiya et al. |
| 2008/0179779 A1 | 7/2008 | Kibol et al. |
| 2012/0104306 A1 | 5/2012 | Kamiya et al. |
| 2017/0022082 A1 | 1/2017 | Prabhu et al. |
| 2017/0240450 A1 | 8/2017 | Meng et al. |
| 2018/0186673 A1 | 7/2018 | Zubko et al. |

FOREIGN PATENT DOCUMENTS

| | | | |
|---|---|---|---|
| CN | 202808558 U | 3/2013 | |
| CN | 103043897 A | 4/2013 | |
| CN | 202849233 U | 4/2013 | |
| CN | 203033871 U | 7/2013 | |
| CN | 203256109 U | 10/2013 | |
| CN | 203397236 U | 1/2014 | |
| CN | 203429057 U | 2/2014 | |
| CN | 203960029 U | 11/2014 | |
| CN | 104211296 A | 12/2014 | |
| CN | 104291551 A | 1/2015 | |
| CN | 204079775 U | 1/2015 | |
| CN | 204097308 U | 1/2015 | |
| CN | 204097326 U | 1/2015 | |
| CN | 204097327 U | 1/2015 | |
| DE | 102008004739 A1 | 7/2009 | |
| EP | 2000442 A2 * | 12/2008 | ............ C03B 37/083 |
| GB | 627863 A | 8/1949 | |
| KR | 2006104780 A * | 10/2006 | ............ C03B 5/021 |
| KR | 20150011074 A | 1/2015 | |
| RU | 2082684 C1 | 6/1997 | |
| UA | 88150 C2 | 9/2009 | |
| WO | 9811029 A1 | 3/1998 | |
| WO | 2013011835 A1 | 1/2013 | |

OTHER PUBLICATIONS

Written Opinion of the ISA; PCT/US2017/037718, dated Aug. 23, 2017.
Lowenstein, "The Manufacturing Technology of Continuous Glass Fibres," Elsevier Science Publishers B.V. 1983 (chp. 4), 95 pages.
Copenheaver, Blaine R., International Search Report PCT/ISA/210, PCT/US2018/016221, dated Mar. 6, 2018, 2 pages.
Gkerou, Elisavet, Extended European Search Report, 17814107.3, dated Jan. 23, 2020, 11 pages.

* cited by examiner

Non-fused particles

APPARATUS AND PROCESS FOR PRODUCING FIBER FROM IGNEOUS ROCK

BACKGROUND OF THE INVENTION

One of the primary challenges of making fibers from igneous rock is the complex mineral structure of igneous rock. Typical igneous rocks that are suitable for fiber formation are complexes of feldspars, quartz, feldspathoids, olivines, pyroxenes, amphiboles, and micas. A number of geological studies of the mineral composition of igneous rocks in the USA, Saudi Arabia, Japan, Russia, Ukraine and Kirgizstan, furthermore, revealed that the majority of existing igneous rock deposits contains some quantity of infusible minerals such as quartz, forsterite, corundum, zirconium and the like randomly distributed throughout the rock deposit. The presence of such minerals in the raw material causes inefficiencies in the continuous rock fiber manufacturing process by interrupting the attenuation process, increasing fiber breakages, and choking the bushings. Also, crystalline particles in the fibers are concentrators of tensions that can significantly reduce the tensile strength and the module of elasticity of continuous fibers. These problems result in fibers of significantly decreased quality since the quality of the fibers depends on the chemical composition of the raw materials and on achieving an homogenous melt of the rock, free of non-molten particles.

A number of these problems with producing an homogenous melt are based on the variety of melting temperatures of minerals found in raw igneous deposits. For example, the melting temperatures of the various minerals include forsterite at 1890° C.; quartz at 1728° C.; corundum at 2050° C.; and zirconium at 2125° C. The presence of these minerals cannot be tolerated for conventional industrial scale technologies since there are no refractories on the market that can withstand such temperatures and attain a reasonable lifetime campaign for the melting furnace. Conventional manufacturing thus requires large expenditures of time and resources just to discover suitable rock deposits to be used as feedstocks.

Achieving an homogenous melt of igneous rocks is also difficult because of the natural darkness of the material. Unlike conventional (artificial) glasses, igneous rocks that are appropriate for fiber formation typically have a complicated mineral structure. Feldspars, quartz or feldspathoids, olivines, pyroxenes, amphiboles, and micas, for example are basic minerals in the formation of such igneous rocks. Additionally, the high content of rock formation oxides such as FeO and $Fe_2O_3$ makes the melted form of igneous rocks dark (not transparent). This darkness prevents radiant heat generated by gas/fuel burners that are normally located above the melt level from substantially penetrating into the melt. As a result, significant gradients of temperatures and viscosities are prevalent from the top to the bottom of the rock melt in conventional processes. These gradients of temperature can prevent homogenization because a decrease in temperature of 150° C., for example, can produces a 5 to 8 fold increase in viscosity of the melt as described in chapters 3 and 3 or Dzhigiris, et al. "Basics of basalt fibers production," *Teploenergetic,* 2002. Using a radiant heat source as described, therefore, requires vigorous stirring of molten rocks and/or implementation of a heat source internal to the melt to improve mass and heat transfer throughout the entire melt. This need to improve heat transfer drives the designs of basically all conventional industrial scale furnaces for melting igneous rocks.

Most furnaces that melt igneous rocks as feedstock for manufacturing fibers are the so-called tank-type large furnaces with melting areas from 3 to 80 square meters. These furnaces often employ fossil fuel burners and/or electrodes made of materials such as tin, molybdenum or graphite for heating the melt. Examples of such furnaces are described in Trier, "Glass Furnaces, Design Construction and Operation," Society of Glass Technology, 2000, (chps, 2, 6 and 8), Lowenstein, "Manufacturing Technology of Continuous Glass Fibres," Elsevier Science Publishers B.V 1983 (chp. 4) and in the following patent documents, U.S. Ser. No. 07/530,240, U.S. Ser. No. 08/037,719, U.S. Ser. No. 08/042, 362, U.S. Ser. No. 08/414,807, US20050103058, US20050223752, US200520060218972, US200520080179779, US20120104306, CN103043897, CN104211296, CN104291551, CN202808558, CN202849233, CN203033871, CN203256109, CN203397236, CN203429057, CN203960029, CN202543025, CN204079775, CN204097308, CN204097326, CN204097327, and UA88150, each of which is incorporated herein by reference.

The basic elements of conventional technology for industrial scale furnaces for melting igneous rocks are illustrated in FIG. 1. In a typical furnace system 10, there is a fore-chamber (11) that can be used for preheating of raw materials or pre-melting; a melting chamber (12) that can include one or more connected parts and is normally used for homogenization; a forehearth (13) and extrusion chambers (14) where fiber forming devices/bushings are placed; and winding apparatuses (15) under the fiber forming devices.

As stated above, achieving a homogenous melt is a primary challenge in producing fibers and is a particular problem for conventional furnaces that rely on gas burners or internal electrodes for heating. Several methods for stirring a molten rock mass have been used in attempts to achieve a more homogenous temperature distribution. Bubbling, for example, is used in most conventional furnaces (see Dzhigiris, Loewenstein, Trier, cited above). This method typically requires installation of one or several rows of bubblers (tubes) across the width at the bottom of the furnace. The flow of hot air supplied through the bubblers helps to provide an upward current through the molten rock. While this method can provide an effective stirring effect, the method has disadvantages such as significantly increasing wear of expensive refractory metals in the melting zone of the furnace. This wear is due to the intensive melt currents at such high temperatures which greatly increase the rock melt/refractory interaction, reducing furnace life time. Installation of bubblers also requires institution of additional safeguard measures since bubblers tend to become chocked (blocked) and unserviceable. Reliable bubblers are also expensive since they are typically made of Platinum-Rhodium (Pt—Rh) alloy, significantly increasing the capital required to manufacture the furnace.

A second method of improving mass and heat transfer throughout a melt volume is installation of heating elements inside the melting zone. Various types of electrode heating elements are widely used in the glass industry (see Trier and Loewenstein, cited above), and they are used or at least proposed for use in melting igneous rocks (U.S. Pat. No. 6,647,747). Although decades of research has been conducted to design electrodes for use in an igneous rock melt, many significant difficulties remain unresolved, including many of the same or similar problems caused by the use of bubblers. For example, uneven distribution of heat between cylindrical electrodes requires special electrical and mechanical arrangements. Plate electrodes, however, are unserviceable and usually require the expense of complete furnace shutdown for replacement. In addition, the aggressiveness of rock melt can wear the electrodes twice as fast as electrodes in a glass furnace, and electrode heating elements can significantly increase both capital and operating expenses since this approach requires an advanced electrical system and special teams of qualified personnel for daily servicing of the electrode system.

Yet another method known in the art for improving heat and mass transfer in melting igneous rock is to apply mechanical stirrers, weirs and various geometrical arrangements. Mechanical stirrers are often used in conventional glass furnaces (see e.g. Trier) and are commercially available for such use. However, the lifetime of such stirrers can be short due to the corrosiveness of the melt and can be further shortened with the increase in operating temperatures required for igneous rock. Development of fusion cast refractory materials has resulted in only a slight improvement in operating life time. Neither has the installation of weirs (Trier) or special vertical cascading holes (U.S. Pat. No. 6,647,747), used in promoting glass body homogenizing offered any significant improvement.

The preceding discussion makes it clear that technology used in glass fiber production does not transfer easily or simply to the production of fibers from igneous rock, at least because of the heterogenous nature of the starting material and its varied melting points, the difficulty in achieving and maintaining a homogenous melt due to the darkness of rock melt versus glass, and the higher melt temperatures required for igneous rock. There is still a need, therefore for systems and methods of producing good quality fibers through achieving a homogenous melt of igneous rocks that are both effective and cost efficient.

Another problem with conventional systems and methods is the expense of the fiber forming devices. Conventional fiber forming technologies require expensive bushings made of materials such as Pt—Rh. The maximum number of tip bushings available for rock fiber formation is believed to be 1200 as compared to 6000 tip bushings for use in fiberglass production. The number of tips is limited with conventional technology because of the darkness of rock melt which makes maintenance of homogeneity difficult as described above. Additionally, the temperature interval of fiber formation is narrow compared to conventional glasses, as for example, the interval of allowed variance is 20° to 70° or in some examples, 30° to 60° C. for rock versus 180° to 200° C. for glass. This narrow tolerance makes the fiber formation from rock very sensitive to temperature gradients. Furthermore, the presence of iron oxides in igneous rocks increases the wettability of Pt—Rh plate by rock melt, requiring the distance between tips of rock fiber bushings to be almost twice as far as the distance between tips of conventional glass bushings. Based on bushing geometry limitations and the cost of Pt—Rh, a typical bushing for rock fibers has only one quarter of the number of bushings as do bushings of the same size for conventional glass fibers, resulting in a fourfold reduction in production capacity as compared to glass.

Fiber-forming devices for continuous mineral fibers widely known as bushings have been a significant challenge in rock fiber manufacturing technology due to basically the same reasons mentioned above, i.e., the complex mineral structure of raw materials (rocks) and high level of iron oxides content.

The first attempts to design bushings for producing continuous mineral fibers were made in the 1960's in the Soviet Union. Rock melt bushings that basically copy the design of glass fiber bushings have not had much success. Difficulties in obtaining uniformity of composition and temperature melt and brining to the bushing plate have led to process instability, high levels of filaments breakages and overall process inefficiencies.

The first bushings appropriate for the manufacturing of continuous mineral fibers on an industrial scale was introduced to the industry at the beginning of the 1980's (see, e.g. SU1211230, SU461908). The basic feature of that bushing design was the presence of an additional electric heater in the form of a tube (downstream pipe), which was placed into the basalt melt at the bottom of the forehearth and extended to a regular fiber-forming bushing beneath the forehearth. The pipe thus took basalt melt from a single small spot in the forehearth, and delivered material from that location in the forehearth to the bushings based on the assumption that material from that single location could be considered as having uniform composition and temperature.

This conventional design has many limitations. First, the diameter of the downstream pipe cannot be large enough to supply a sufficient amount of melt to the bushing plate to have a competitive production capacity compared to conventional fiberglass technology. Rock melt (and basalt in particular) has up to 15% iron oxides resulting in a dark melt that is not transparent like glass melt. The heat in the pipe is thus limited to conduction heat as there can be essentially no radiation or convection heat transfer in the dark melt. Because the pipe's wall is heated electrically and heat transfer is all by conduction, the melt is typically overheated at the "wall-melt" contact point and the temperature of the melt decreases exponentially toward the center axis of the pipe. The diameter of the pipe is thus limited by the need to deliver the melt to the bushing (orifice) plate as close as possible to a uniform temperature (and thus viscosity). Despite much research and development directed to overcoming the obvious limitations of this design, the downstream pipe design has historically been widely used in almost all basalt manufacturing facilities worldwide.

This limitation in downstream pipe diameter also limits the number of orifices that can be used in the bushing plate. The downstream pipe cross-sectional area effectively cannot exceed 40% of the total cross-sectional area of all orifices. Therefore, commercial manufacturing processes using the downstream pipe are essentially limited to 836 orifice bushing plates compared to 4800 orifice bushing plates normally used in the conventional fiberglass industry. This system is even further limited by requiring a downstream pipe composed of Pt—Rh alloy which results in at least a 30% increase in bushing cost.

During operation, conventional fiber forming devices (bushings) are electrically heated to compensate for the sharp temperature and viscosity drop from the upper edge of the bushing container to the orifice (nozzle) plate. The standard method of heating the bushings is by connecting the orifice plates across the low voltage windings of a step-down transformer that typically operates at 3-6 volts and several thousand amperes, depending on the size of the bushing. This approach makes heat distribution in the bushing plates solely a function of electrical current patterns. This causes a problem because while the current is constant for the whole bushing assembly, heat is not. This effect is due to variation in the resistance. Heat production is subject to the formula power, $P=I^2R$, Electrical resistance (R) in the thinner sections is higher than in thicker sections, resulting in higher temperature in the thinner sections.

Fiber forming devices are constructed as combinations of metal sheets of differing thicknesses that are welded together along the edges, often running from one terminal to another.

Thus some lateral flow of the current is inevitable, affecting temperature distribution in a way that is not easy to predict. In an attempt to maximize uniform heat distribution, conventional fiber forming devices often have a long rectangular shape with electric terminals clamped along a short side of the orifice plate.

These clamps occasionally require adjustments inwardly or outwardly to achieve a more even distribution of temperature over the whole orifice plate. This adjustment involves disconnecting the power, loosening the clamp bolts, sliding the contact to a different position with respect to the bushing terminal, and re-tightening of the clamp bolts. The effect of the adjustment cannot be determined until the bushing has returned to operating temperature. So if the adjustment does not achieve the desired effect, the process must be repeated. Further inefficiency can be caused by inevitable breakage of terminals during the adjustment process.

Additional attempts have been made to overcome the problem of maintaining homogeneity in the melt as it is transferred to and through the bushing. One method includes adding heating elements into the interior of the pipes. The solution, however, still depends on localized conduction heating in the melt and the further increased maintenance and operating costs associated with placing heating elements in the melting furnace.

Other difficulties in producing fibers include those occurring at the filament attenuation process as the filament is drawn from the orifice. Conventional materials used in bushing designs are wetted to some extent by the rock melt. The wettability of the orifice plate strictly depends on the temperature of the melt. The higher the temperature, the lower the contact angle. The wettability of the orifice plate by rock melt is much higher than by conventional glasses because of the high iron oxides content typically present in rock melt. This causes the molten rock (basalt in particular) to run up the outside of a nozzle, spreading and eventually covering the whole underside of the orifice plate. The melt has to be removed by a tedious cleaning operation before fiber drawing can continue. It was found that this problem could be virtually eliminated by providing the nozzles with counter-bores, or by making the nozzle wall as thin as possible. Before fiber is drawn from a nozzle, melt flows through it, forms a drop suspended from the annular ring constituting the exit of the nozzle, and then falls away leaving the fiber attached to the nozzle via a meniscus, provided the viscosity of the melt is within the range suitable for fiber drawing. The time taken for a drop of melt to form and fall away in this fashion is a function of the size of the drop which, in turn, is a function of the area of the annular ring. Therefore, the thinner the wall of the nozzle at the exit, the faster a drop will form and the lower the tendency to wet the outer vertical surface of the nozzle. US Application Publication No. 2006/0218972, incorporated herein by reference, addresses this issue by providing a flat orifice plate with just holes with no nozzles installed. Such an arrangement, however, increases the tendency to wet over time.

These issues with the nozzle are again aggravated by the nature of rock melt and cannot be solved by merely transferring glass fiber forming technology to the production of fibers produced from igneous rock. There is a need, therefore, for improvement not only in melting technology but also in the fiber forming aspect of systems and methods for manufacturing rock fibers.

SUMMARY

The current disclosure addresses at least some of the deficiencies of the prior art by providing fully electric apparatuses for manufacture of continuous fibers from igneous rocks, including, but not limited to rhyolite, dacite, andesite, basalt, diabase, granite, granodiorite, diorite, gabbro, and the like and mixtures thereof. In certain embodiments the disclosed apparatus and methods manufacture high quality, completely homogenous, ductile and continuous fibers of at least 5 microns in diameter from volcanic and plutonic rocks with silica contents of at least 40%-70%. Such fibers have high mechanical strength and exceptional chemical and temperature resistance. Fibers produced by the disclosed methods and apparatuses can be used in numerous high-tech applications in a variety of industries, including but not limited to the construction industry; the chemical, cryogenic and oil industries; the automotive and marine industries; as well as for space, defense and ballistic applications; fire and heat protection; sound insulation; civil engineering and pipes; and high-pressure tanks and cylinders.

The disclosed apparatuses and methods for manufacturing continuous fibers from igneous rock are capable of melting all suitable igneous rocks by producing an excellent stirring effect through the proper combination of induction power and frequency, and eliminate the need for a special homogenization chamber/zone since homogenization occurs during the melting stage. The apparatus requires no mechanical means for homogenization and achieves homogenous melts lacking cold spots and extreme temperature gradients.

The present disclosure can be described in certain embodiments, therefore, as a method of producing fibers from igneous rock, the method including adding a volume of crushed igneous rock to a furnace chamber, wherein the furnace chamber is wrapped with an electrical induction coil; applying alternating current to the induction coil, effective to heat the volume of crushed igneous rock added to the furnace chamber and to produce a substantially homogenous rock melt in at least a portion of the volume of igneous rock; and passing at least a part of the homogenous rock melt portion through a fiber forming chamber and subsequently passing at least a portion of the volume of igneous rock from the fiber forming chamber through fiber forming orifices under controlled temperature effective to produce fibers, wherein the fiber forming chamber is wrapped in an electrical induction coil and the temperature of the homogenous rock melt portion in the fiber forming chamber is controlled by the power and frequency of electrical current in the induction coil surrounding the fiber forming chamber. The method also may include controlling the temperature at the fiber forming orifices to within 20° to 70° or in some examples, 30° C. to 60° C., or within 5° C. to 10° C. or less of a target temperature, which is the optimal temperature for forming fiber from the particular batch material. The appropriate temperature, for example, should be high enough to maintain the rock melt in an homogenous state, and cool enough to allow the material to be drawn out through the fiber forming orifices to form fibers without excessive wetting of the orifice plate.

The disclosed methods can further include passing at least a portion of said homogenous rock melt portion through a conditioning chamber surrounded by an electrical induction coil and cooling the homogenous rock melt portion effective to produce a laminar flow in at least a portion of the conditioning chamber prior to passing the homogenous rock melt portion into the fiber forming chamber. It is understood that the electrical induction coils surrounding the conditioning chamber and the fiber forming chambers can be connected to the same or different electrical generators or circuits or that the power and frequency of the circuits can be individually controlled.

In certain embodiments the volume of crushed igneous rock can be pre-heated prior to being added to the furnace chamber and the pre-heating step can be accomplished at least in part by transferring hot exhaust gasses from the furnace chamber to a batch charger containing a batch of crushed igneous rock. During operation, a volume of crushed igneous rock is pre-heated and then released into the furnace chamber down a chute or ramp, where the batch is then heated to a temperature of from about 1200° C. to about 3000° C. In certain embodiments the temperature is determined by a pre-test of the igneous rock to determine the optimal melt temperature, which will vary depending on the composition of each particular starting material.

The furnace chamber can be divided into a first zone and a second zone separated from the first zone by an underflow baffle and wherein said second zone is in fluid communication with a conditioning chamber through an opening in the wall of said furnace chamber. The conditioning chamber can include one or more openings in the bottom surface thereof providing fluid communication between the conditioning chamber and one or more fiber forming chambers. The fiber forming chambers can be wrapped in a temperature water jacket effective to cool the walls of the fiber forming chambers effective to form a layer of skull on the inside surface of the fiber forming chambers. In certain embodiments, the crushed igneous rock can include basalt and can also include at least one of feldspars, quartz, feldspathoids, olivines, pyroxenes, amphiboles, and micas. The igneous rock can also include any of rhyolite, dacite, andesite, basalt, diabase, granite, granodiorite, diorite, or gabbro. In certain embodiments the igneous rock is primarily basalt with mixtures of certain other minerals to affect selected properties of the produced fibers, such as improvement of mechanical or chemical properties, for example, or improved shielding or radiation resistance. In certain embodiments, the crushed rock samples can include minerals that can contain chemical elements, including but not limited to: zirconium, boron, cadmium, hafnium, gadolinium or europium.

In still further preferred embodiments the methods can include placing temperature sensors at least in the conditioning chamber and the fiber forming chambers and controlling the temperature in the conditioning chamber and fiber forming chambers through computerized control of the electrical current in the induction coils based on feedback received by a computer from the temperature sensors.

The disclosure can be described, therefore, in certain embodiments as a method of producing fibers, comprising the steps of:

obtaining a quantity of crushed igneous rock to be converted to fiber;

placing a batch of said quantity of crushed igneous rock and any required or optional additives in a batch charger and preheating said batch;

transporting said batch to a first chamber of a melting furnace, wherein the melting furnace is wrapped with a first electrical induction coil;

applying alternating current to the first induction coil, effective to heat the batch to a temperature greater than the melting point of all minerals in the batch to produce an homogenous rock melt;

flowing the homogenous rock melt under an underpass baffle into a second chamber of the melting furnace;

flowing the homogenous rock from the second chamber into a conditioning chamber through an opening in an upper portion of a wall of said second chamber of said melting furnace, wherein said conditioning furnace is wrapped with a second induction coil;

applying electrical current to the second induction coil effective to suppress conductive stirring of rock melt and to allow temperature to decrease to produce conditioned rock melt;

flowing said conditioned rock melt into a plurality of fiber forming chambers, wherein each fiber forming chamber is wrapped in a fiber forming chamber inductive coil;

applying electrical current to the fiber forming chamber inductive coils, effective to reach and maintain conditioned melt at fiber forming temperature;

flowing conditioned melt from fiber forming chambers through a plurality of orifices in bottom surface of each fiber forming chamber to produce fibers extruded from at least a portion of said orifices;

shock cooling the fibers by spraying water mist on said fibers as they emerge from the orifices; and gathering individual fibers into a plurality of strands with a gathering shoe; and winding each of said strands on a winder.

The methods can further include continuous processing including repeating the steps of obtaining a quantity of crushed igneous rock to be converted to fiber;

placing a batch of said quantity of crushed igneous rock in a batch charger;

preheating said batch; and transporting said batch to a first chamber of a melting furnace, wherein the melting furnace is wrapped with an electrical induction coil. Additional repeatable steps may include further removing heated gasses from said second zone of said melting furnace and flowing said gasses into said batch charger, and controlling the temperature in said furnace and chambers with a computer; wherein the computer receives temperature data from temperature sensors placed in said conditioning chamber and in each of said fiber forming chambers and controls power level and AC frequency based on data received from said temperature sensors.

The disclosed methods of preparing igneous rock for use in production of fibers can also include placing raw, crushed igneous rock in a melting furnace, wherein the melting furnace is wrapped with an electrical induction coil electrically connected to a generator; and applying high frequency AC electrical current to said induction coil from said generator with sufficient power to raise the temperature above the glass melting point of all mineral constituents of said igneous rock.

In certain embodiments, the disclosure can also be described as an apparatus for producing fibers comprising:

a batch charger comprising a hopper for receiving crushed basalt or raw igneous rock;

a melting furnace configured with an opening to receive batches of raw basalt or igneous rock, wherein said melting furnace comprises a chamber divided into a first zone for receiving charged batches and a second zone for prepared melt, wherein the first and second zones are divided by an underflow baffle and wherein a wall of the second zone forms an exit opening positioned nearer to the top of the melting furnace chamber than to the passageway under the underpass baffle;

a melting furnace electrical induction coil wrapped around said melting furnace;

a first generator and high frequency converter electrically connected to said melting furnace electrical induction coil;

an air channel connecting said second zone to said batch charger and comprising a pump configured to draw gasses from the melting chamber and to deliver said gasses to batch charger;

a cooling jacket disposed in the walls of said melting furnace and connected to one or more first water supply and heat exchanger units;

a conditioning chamber comprising a horizontal channel with a first end and a second end, wherein the conditioning chamber is in fluid communication with said second zone through said exit opening, and wherein the bottom wall of the conditioning chamber forms a plurality of openings in spaced relation along the length of the conditioning chamber toward said second end;

a conditioning chamber electrical induction coil wrapped around the conditioning chamber;

a second generator and high frequency converter electrically connected to said conditioning chamber electrical induction coil;

a cooling jacket disposed in the walls of said conditioning chamber and connected to one or more second water supply and heat exchanger units;

a plurality of fiber forming chambers, each disposed below the conditioning chamber and in fluid communication with the conditioning chamber through one of said openings in the bottom wall of the conditioning chamber, and each fiber forming chamber comprising a fiber forming surface disposed in the bottom of each of said fiber forming chambers, and further wherein each fiber forming surface comprises a plurality of orifices sized and configured to form filaments from the rock melt as it passes through said orifices;

a fiber forming chamber electrical induction coil wrapped around each fiber forming chamber;

a third generator and high frequency converter electrically connected to each fiber forming chamber electrical induction coil; and a cooling jacket disposed in the walls of each fiber forming chamber and connected to a third water supply and heat exchanger unit. It is understood that the water jackets, or cooling jackets can be separately controlled for each of the chambers or one or more of the chambers can share common cooling water supplies.

The disclosed apparatus can further include one or more of a plurality of temperature sensors disposed in the melting furnace, the conditioning chamber and in each fiber forming chamber, a plurality of water sprayers configured to spray mist on filaments as they emerge from said orifices, one or more gathering shoes each configured to consolidate fibers from one of said fiber forming chambers, one or more winders configured to receive filament from one or more of said shoes, and one or more computers configured to receive temperature and water flow data from said apparatus and to control said power generators, frequency converters and water supplies, and to control introducing additional batches into the heating furnace as needed. The batch charger can, therefore include a motor configured to provide vibration to said hopper configured to facilitate emptying of the hopper.

In certain embodiments, the apparatus can further include one or more of cooling jackets comprising copper or stainless steel tubes, each in fluid communication with a water supply and heat exchange unit, a first generator which can be, but is not limited to, a 500 kW generator, one or more second generators, wherein the second generators can be, but are not limited to, 250 kW generators, and heat exchange units that comprise an air cooler or a cooling tower. Each fiber forming surface can comprise a metal, ceramic or combination of metal and ceramic plate, wherein the metal plates can comprise platinum or a platinum alloy, and wherein each of said fiber forming surfaces comprises from about 200 to 2000 orifices. In certain embodiments the fiber forming chambers can be cylindrical in shape and wherein the fiber forming surface is round and forms substantially the entire bottom surface of the fiber forming chamber.

It is understood that the generators described herein are representative only, and that the power and frequency used for any particular batch of material will depend on the capacity of the apparatus, the material being processed and on the required temperature. For example, an apparatus with a capacity of 150 kg of melt per hour can utilize, for example, a first (main) generator providing a power of 500 kW at a frequency of 3 MHz to achieve a melt temperature of 2600° C., a secondary generator providing a power of 200 kW at a frequency of 10 kHz to achieve a temperature of 1500° C., and one fiber forming surface including up to 2400 orifices. It is further understood that for an industrial scale apparatus with a capacity of 1200 kg of melt per hour, can utilize for example, a main generator providing a power of 4 MW at a frequency of up to 30 MHz to achieve a melt temperature of 3000° C. and one or more secondary generators, each providing a power of 300 kW at frequency of up to 100 kHz to achieve a melt temperature of 1500° C. and utilizing multiple fiber forming devices totaling from about 1000 to about 6000 orifices. It is understood that smaller, or much larger furnaces may be employed and that the power and frequency provided to the coils are tailored to particular raw feedstock and continuous output capacity. Generators for use in the current disclosed apparatus and methods can, therefore include those capable of power output from about 1 kW to 10 MW or greater as needed and at compatible frequencies from about 60 Hz to 100 kHz, or from about 1 kHz to 100 MHz, for example.

The disclosure can also be described in certain embodiments as a fiber made by the disclosed processes. Such fibers can include fibers with a diameter of from 1 micron ($\mu$m) to 100 $\mu$m, or more, depending on the raw material, the intended use, and the structure of the fiber forming surfaces. The fibers can include diameters of 1 $\mu$m, 2 $\mu$m, 3 $\mu$m, 4 $\mu$m, 5 $\mu$m, 6 $\mu$m, 7 $\mu$m, 8 $\mu$m, 9 $\mu$m, 10 $\mu$m, 12 $\mu$m, 15 $\mu$m, 17 $\mu$m, 20 $\mu$m, 25 $\mu$m, 30 $\mu$m, 35 $\mu$m, 40 $\mu$m, 45 $\mu$m, 50 $\mu$m, 55 $\mu$m, 60 $\mu$m, 65 $\mu$m, 70 $\mu$m, 75 $\mu$m, 80 $\mu$m, 85 $\mu$m, 90 $\mu$m, 95 $\mu$m, or 100 $\mu$m for example, or any other specific size within that range. The disclosed fibers can be free, or substantially free, of non-fused crystalline particles when viewed microscopically. By substantially free, it is meant at least 80% or at least 90% or more than 99% of the fibers by volume or cross-sectional area contain no visible crystalline particles. A view of crystalline particle free fibers is shown microscopically in FIGS. 5C and 5D. As can be seen in the figures, the fibers (5C and 5D) made by the disclosed process are free of visible crystalline particles, whereas the fibers in 5A and 5B, made by conventional fiber forming processes, contain easily visible, high levels of crystalline particles as indicated by the arrows.

BRIEF DESCRIPTION OF THE DRAWINGS

The following drawings form part of the present specification and are included to further demonstrate certain aspects of the present inventions. The disclosure can be better understood by reference to one or more of these drawings in combination with the detailed description of specific embodiments presented herein.

DETAILED DESCRIPTION

The disclosed apparatus and methods address at least some of the problems of producing fibers with conventional furnace technology at least because they do not utilize refractories for kiln heat insulation and they have the ability to heat the rock melt homogenously up to 3000° C. without a mechanical apparatus for stirring. This can achieve a 100% homogenous state of the rock melt even in the presence of such infusible minerals as quartz/quartzite, forsterite; corundum; zirconium, etc. Furthermore, the formation of a layer of skull on the furnace wall protects the furnace from the effects of high temperature and aggressive melt, reducing wear of the walls and greatly extending furnace life. A furnace of the present disclosure is believed to likely have a useful lifetime of 20 to 30 years, for example, as compared to a lifetime of 2-5 years for a furnace used in conventional rock melting technologies.

There are three basic stages of melting igneous rock in a furnace, startup (including initial lighting and/or heating to target temperature), routine operation, and shutdown, typically for repair or maintenance. Due to the technical limitations of conventional tank furnace design and refractory materials, the startup process of lighting and heating usually requires a gradual ramp up in temperature with adjustments to the structure as the temperature increases, a process that takes an average of up to 20 days. The time for shutdown for a conventional furnace is approximately equal to the startup, to avoid cracks and destruction of refractories during cooling. During the normal operational mode for conventional furnace tanks, inefficiencies are often experienced due to the inertia of the melt, especially dark melt, as with igneous rock. Conventional heating devices such as gas or heating electrodes act locally causing temperature discontinuities to exist throughout the volume. In certain cases it can take hours to achieve an homogenous temperature.

By contrast, the disclosed apparatus and methods can achieve a uniform thermal effect on the entire volume of the melt through circular electric currents, known as eddy currents, induced within the melt by a changing magnetic field. Eddy currents, also called Foucault currents, are loops of electric current induced within conductors by a changing magnetic field in the conductor, due to Faraday's law of induction. Eddy currents flow in closed loops within conductors, in planes perpendicular to the magnetic field. This process distributes heat evenly throughout the entire volume of the melt, which serves as the conductor in this case. The procedures for startup and shutdown for an apparatus of the present disclosure can take just an hour and adjusting the melt temperature of the entire body of melt can take minutes. The process is thus very flexible, and can be stopped and started at any time as needed without long delays.

Figure 1:
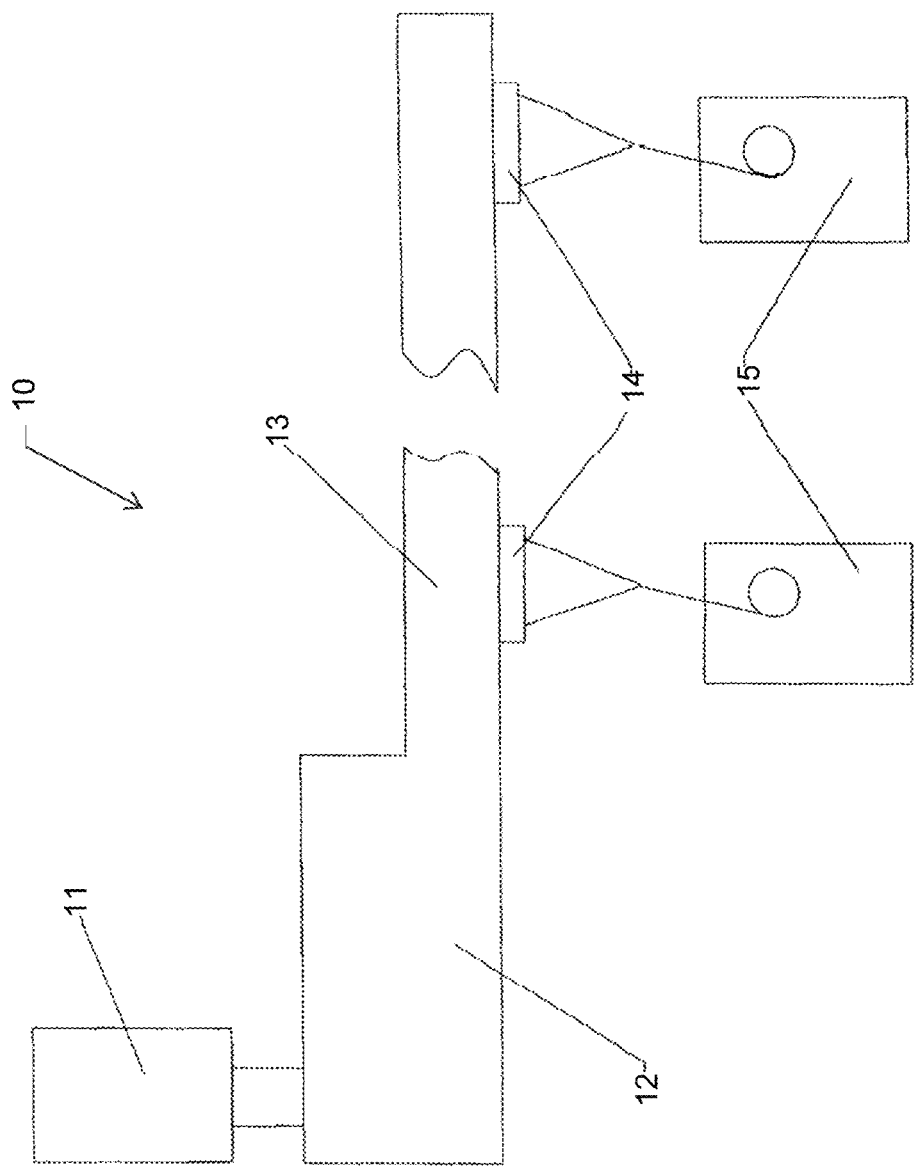
FIG. 1 is a schematic drawing of a typical furnace system as known in the art for producing fibers from igneous rock.
Figure 2:
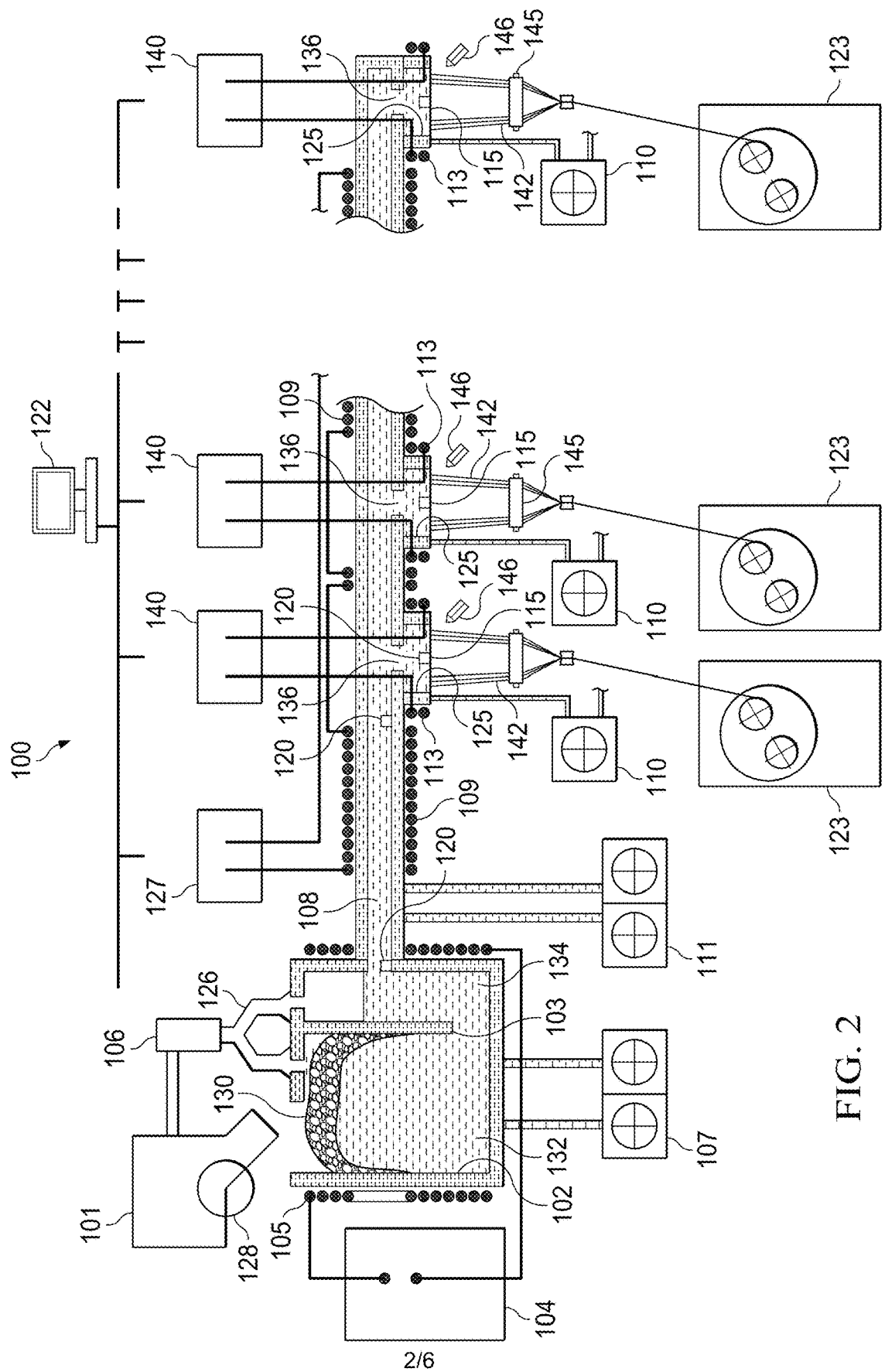
FIG. 2 is a schematic drawing of a preferred embodiment of a fiber production apparatus.
Figure 3:
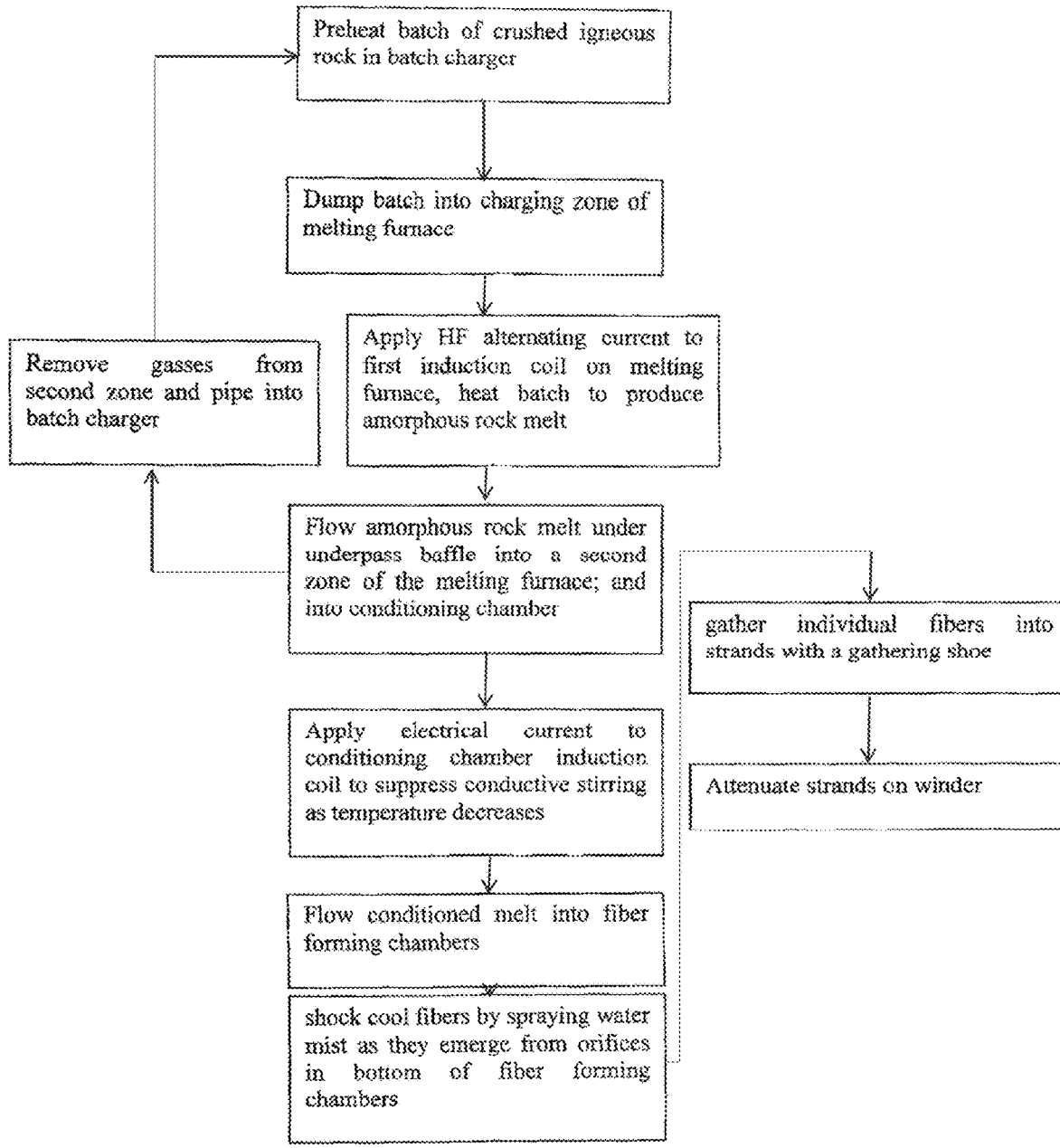
FIG. 3 is a flow diagram of a preferred process.

An example of a preferred embodiment of an apparatus for manufacturing continuous fibers is shown in FIG. 2. The apparatus 100 includes a batch charger 101 which includes a hopper for receiving crushed basalt or raw igneous rock. The hopper can be designed to hold approximately 25 cubic feet in some embodiments, and up to 1200 cubic feet or more in an industry setting, and can include one or more small motors 128 of from 2 to 5 horsepower for example, or even 2.5 horsepower to vibrate the charge from the hopper to a tray for dumping the raw rock 130 into the melting chamber 102. The melting chamber 102 is divided into two zones, the charging zone 132 and the prepared melt zone 134. The two zones are separated by an underflow baffle 103 to maintain the melting ore in the charging zone until complete homogeneity is achieved. While described herein as a single melt and charging zone in a furnace chamber, it is understood that multiple chambered furnaces can be employed in the processes described herein, in which one or more melt zones are separated from one or more charging zones by one or more baffles, or that variations of baffles other than underflow baffles can be employed.

A generator and power supply 104 provide electrical current to an induction coil 105 that wraps the melting chamber 102. In certain embodiments a 500 kW power supply with a high frequency (HF) converter can be used. It is understood of course, that choice of power supply and converter frequency will depend on the particular application and furnace design, and that the described power is an example of a preferred embodiment. Additionally, the power supply and converter can be contained in a single device as shown, or can be in separate locations as required by individual furnace design. For example, a single electrical coil can serve multiple furnaces, or a single furnace or chamber can employ multiple induction coils.

A pump 106 draws gasses from the melting chamber through piping 126 and supplies the heated gas to the batch charger 101 for preheating. A water supply and heat exchanger unit 107 are also connected to the melting chamber 102 for cooling. A heating exchanger can be of any type known in the art and can be selected from dry air coolers and cooling towers, for example, or other types depending on the environment in which the furnace is operated.

The melted rock is drawn from the prepared melt zone 134 into a conditioning chamber 108 connected to melting chamber 102 in such a way that the melt flows from the charging zone 132 under the underflow baffle 103 and rises to the opening into the conditioning chamber. The conditioning chamber is preferably configured as a horizontal channel that cools the melt from the furnace temperature to the fiber forming temperature, and directs the melt to the fiber forming chambers. The melt can be cooled, for example from temperatures in the range of 3000° C. or 2000° C. or 1800° C. or 1400° C. to a temperature that reduces turbulence and produces laminar flow in the conditioning chamber 108. Flow can be controlled in response to temperature readings provided by temperature sensor devices 120 disposed at various points of the flow path including at the opening into the conditioning chamber 108 as shown. It is understood that sensors can be placed throughout the system as needed and that the placement of sensors in the embodiment shown in FIG. 2 is only an example and is not limiting.

The temperature in the conditioning chamber 108 is controlled in a preferred embodiment by a separate induction coil 109, powered by a separate generator and power supply 127, and cooled by a separate water supply and heat exchanger unit 111. The power supply 127 for the conditioning chamber 108 can be smaller, such as 250 kW for use in a particular embodiment, for example, and the water supply and heat exchanger can be separate but of the same types as the heat exchanger for the melting chamber. It is understood, however, that the conditioning chamber can have a lower cooling capacity requirement.

A plurality of fiber-forming chambers 125 extend from the bottom along the channel of the conditioning chamber 108 and include an upper opening 136 for flow of melt into each fiber-forming chamber 125. The number of fiber-forming chambers is determined by the capacity of the melting chamber and can be 2, 3, 4, 5, 10, 20 or more. The fiber-forming chambers can be considered as small furnaces with tightly controlled temperatures. Each fiber-forming chamber 125, in this particular embodiment, includes an induction coil 113 and in certain embodiments, individually controlled power supply and generator 140, and water supply and heat exchanger system 110. The bottom of each chamber 125 is formed at least in part by a fiber-forming device 115 which can be a metal plate such as a platinum or platinum alloy plate attached to the bottom of each fiber-forming chamber 125 and including a pattern of openings or orifices, optionally tipped by nozzles. As the cooling melt is drawn through the orifices to form fibers 142, cooling water sprayers 146 shock cool the fibers with mist to prevent recrystallization. The fibers are then gathered into filaments on a shoe device 145 and attenuated on winders 123. The process can be controlled and managed with a computerized process management system 122.

Figure 4A:
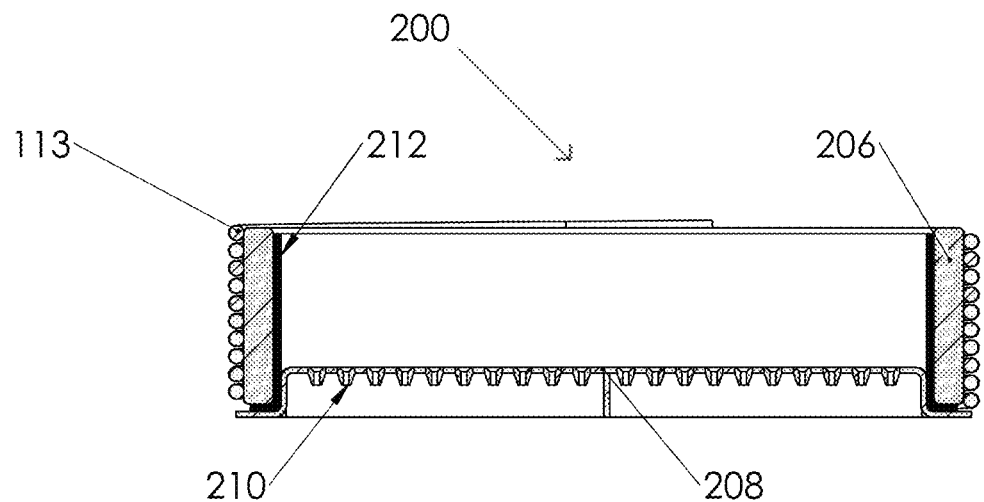
FIG. 4A is a side cross-sectional view of an embodiment of a fiber forming device.
Figure 4B:
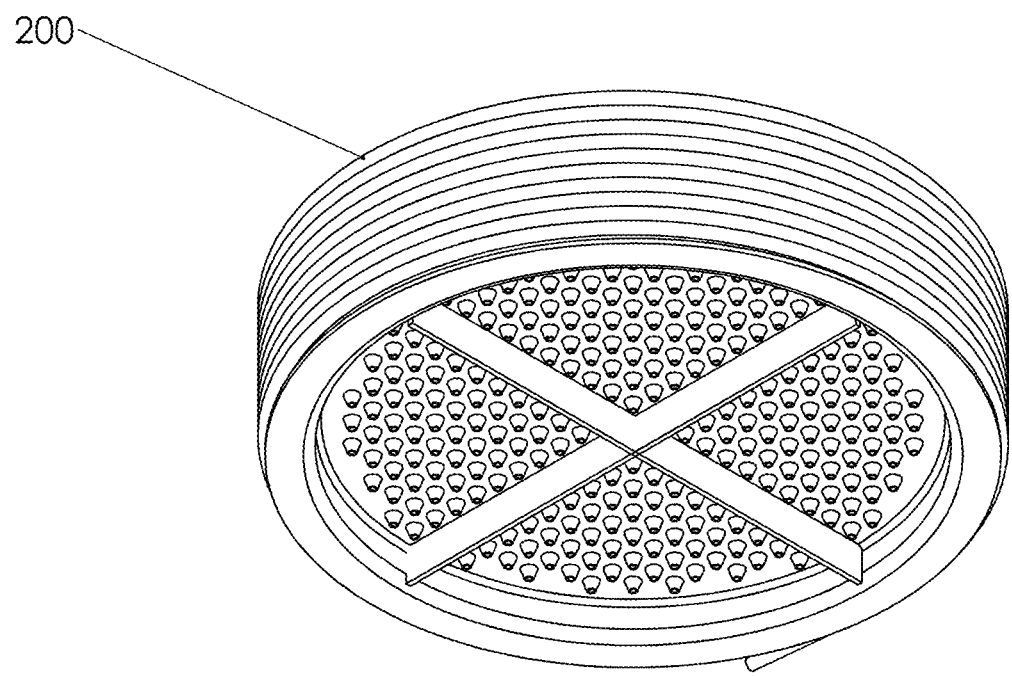
FIG. 4B is an isometric view from the bottom of the fiber forming device of FIG. 4A.
Figure 5A:
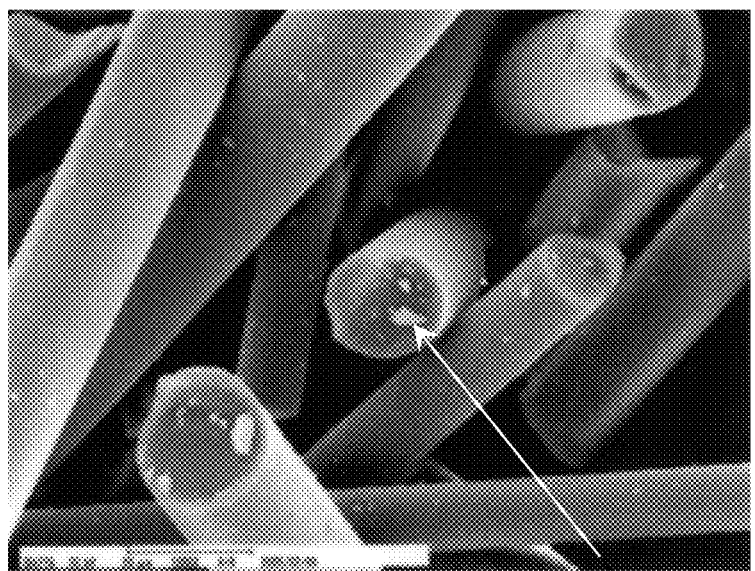
FIGS. 5A-5D are microscopic views of fibers made by conventional melt methods (5A and 5B) and fibers made by the disclosed method and apparatus (5C and 5D).
Figure 5B:
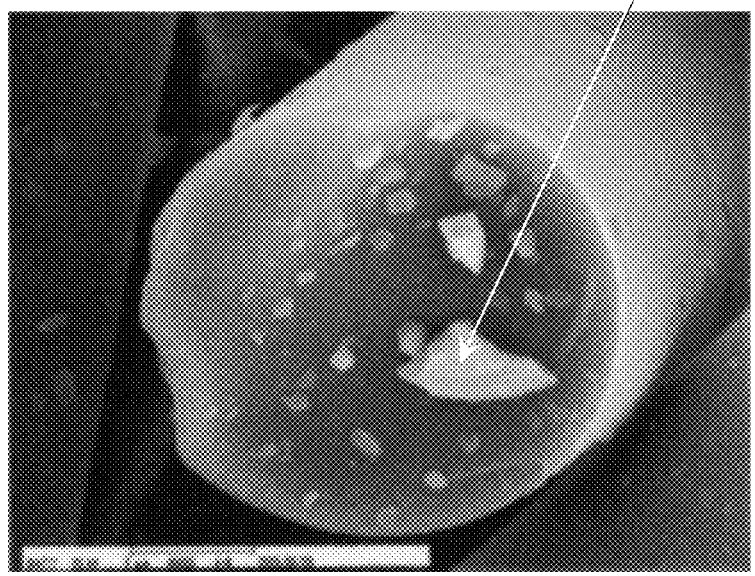
Figure 5C:
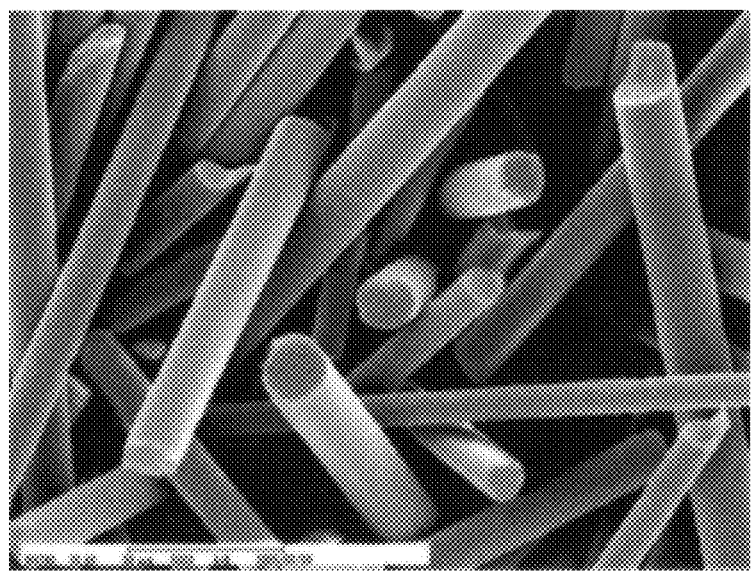
Figure 5D:
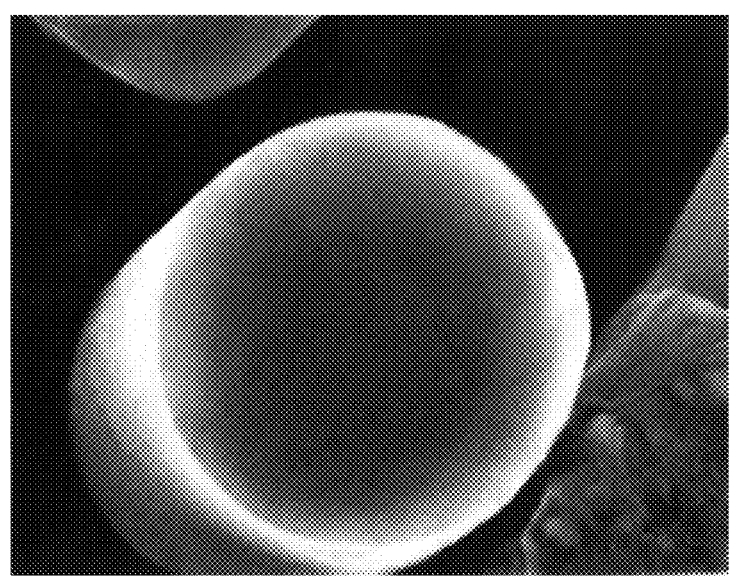

An embodiment of a fiber forming device 200 is shown in FIGS. 4A and 4B. As best seen in FIG. 4B, the fiber forming device 200 is round and the fiber forming chamber 125, which receives the molten rock is wrapped in a water jacket 206, which is wrapped with an induction coil 113. The entire bottom of the chamber forms the orifice (nozzle) plate 208 in which the nozzles 210 are formed. This configuration operates to minimize distortion under operating temperature and under the head of molten rock above the orifice (nozzle) plate; and to maintain the very large orifice (nozzle) plate at uniform temperature.

Hot melt contact with the water-cooled walls of the fiber forming device is solidified to form a thin layer of skull 212, which not only protects the walls from corrosion but offsets the exponential heat distribution from the walls to the center axis of the device. Skull is understood in the art to be a layer of iron or slag solidified on the inner surface of the furnace lining. In embodiments of the disclosure, a round shaped container body, an induction coil and regulation of water temperature and water flow rate in the walls of device make it possible to achieve a uniform heat distribution all over the melt body. With some additional arrangements such as installation of water cooled ribs, the disclosed device allows orifice (nozzle) plates of very large sizes (6000 tips and up) without adversely affecting the fiber attenuation process. This process is thus highly compatible in terms of capacity and production cost with existing conventional fiberglass production processes. It is also up to 50% more energy efficient than conventional orifice (nozzle) plate heating methods.

In the practice of the methods of the disclosure, raw material such as crushed igneous rocks with or without supplemental materials can be preheated in the batch charger 101 and transferred to the primary melt melting chamber 102. In the melting chamber 102 the raw material contacts hot melt within the chamber and is combined with the hot melt as a result of circular electric currents induced by the coil 105. The conductivity and thermal effect on the raw material increases until a complete change of state, from solid to liquid is complete. It is an aspect of the disclosure that the melt process can be enhanced by the addition of graphite, either a graphite ring or powder, to the initial batch. After the initial melt, no further enhancement is necessary. The first melt product that may or may not include an enhancer is typically discarded.

During operation, the frequency F1 and power P1 of a generator 104 are set to provide a stable and intense stirring effect throughout the melt volume, to melt all minerals in the initial raw material and to achieve a 100% homogenous material. By regulating F1 and P1, the melt temperature can be adjusted within a range of from about 1300° C. to about 3000° C., for example.

The melting chamber 102 and underflow baffle 103 can be composed of copper or stainless steel tubes, which can be continuously supplied with cooling water. The walls of the melting chamber 102 and underflow baffle 103 can be protected by skull which is formed between the wall and the melt and water flow can cool the melt at the heat exchanger unit 107.

Gases that are released during the melting process can be pumped out of the melting chamber 102 by pump 106 through special openings in the top of melting chamber 102 and routed to the batch charger 101 for preheating the raw material.

The homogeneous melt then can enter the conditioning chamber 108 located above the bottom level of the melting chamber 102. The conditioning chamber 108 can be connected to the melting chamber 102 on the opposite side from the raw material charger and the melting chamber 102 can include two zones separated by an underflow baffle 103. This baffle can prevent non-molten materials from the charging zone side of the melting chamber from entering the conditioning chamber prior to being fully melted.

The conditioning chamber 108 can be heated by currents induced by coil 109. Frequency F2 and power P2 generated by generator 109 can be set at levels that suppress the stirring effect inside the conditioning chamber 108 and lower the temperature of the melt to reduce turbulence and produce laminar flow in the conditioning chamber.

The conditioned and stabilized melt can then flow to the fiber-forming chambers 125. Each fiber-forming chamber 125 can be made of copper or stainless steel tubes or any appropriate material known in the art, which can be continuously supplied with cooling water provided by a separate water supply and heat exchanger units 110. The cooling of the walls of the fiber-forming chamber 125 by the water creates a layer of skull between the wall and the melt protecting the refractory from degradation by the melt. The temperature and viscosity of the melt inside each fiber-forming chamber 125 can be controlled by generators 140 and induction coils 113. Frequency F3 and power P3 can be set at levels that maintain temperature and viscosity within the narrow range as required for filament formation.

Fiber-forming devices 115 can be attached to the bottom of each fiber-forming chamber 125. Each fiber-forming device can be a specially shaped plate made of heat-resistant materials with numbers of orifices that let rock fiber filaments form as they pass through and out of the orifices. Filaments that are coming out of fiber-forming devices can be exposed to shock cooling by means of fiber filament cooling devices 146. The fiber filament cooling devices 146 can be designed as a set of nozzles, which create a pressurized cold-water mist located just under the fiber-forming device; this arrangement can be necessary to avoid reverse crystallization during the fiber forming process. The process produces 100% homogenous filaments without any crystallinity or surface defects. Crystals and surface defects would significantly reduce the mechanical strength of the fibers. Microphotos of fibers formed by conventional technology and by the disclosed systems and methods are shown in FIG. 5. As can be seen in FIGS. 5A-5D fibers formed by the disclosed method are substantially free of crystalline particles caused by incomplete melting.

The formed filaments then pass through sizing agent applicators (not shown), and can be assembled in strand by gathering shoes 145 and wound on cakes by winders 123. The formed fibers can be preferably of about 8 to about 15 μm in diameter. The entire process can be controlled and managed by a computer process management system 122 that manages frequencies, powers, water flows and charger according to input data received from temperature sensors 120 and winders 123.

It is a further aspect of the disclosure that rock fibers produced by the apparatus and methods disclosed herein are contemplated to be of higher quality, e.g. free or substantially free of weaknesses caused by incomplete melt and produced at lower cost than conventionally produced fibers. The disclosed fibers are thus useful in numerous applications in a variety of industries, including but not limited to the computers and electronic industry, the construction industry; the chemical, cryogenic and oil industries; the automotive and marine industries; as well as for space, defense and ballistic applications; fire and heat protection; sound insulation; civil engineering and pipes; and high-pressure tanks and cylinders. Contemplated as an aspect of this disclosure are the many products that are likely to contain such fibers, including but not limited to, construction beams, concrete, insulation, pipes and tools, computers and electronic devices including antennas, sporting goods, protective equipment for police, defense and recreation as well as structural components of automobiles, boats, airplanes and other types of vehicles. The uses of the disclosed fibers mentioned above and all others apparent to those of skill in the art are contemplated to be within the scope of the present disclosure.

All of the apparatus, compositions and methods disclosed and claimed herein can be made and/or executed without undue experimentation in light of the present disclosure. While the apparatus, compositions and methods of this disclosure have been described in terms of preferred embodiments, it will be apparent to those of skill in the art that variations may be applied to the apparatus and/or compositions and in the steps or in the sequence of steps of the methods described herein without departing from the concept, spirit and scope of the invention. More specifically, it will be apparent that certain materials or structures that are chemically, functionally or structurally related may be substituted for those described herein while the same or similar results would be achieved. All such similar substitutes and modifications apparent to those skilled in the art are deemed to be within the spirit, scope and concept of the invention as defined by the appended claims.

The invention claimed is:

1. A fiber forming device for use in furnaces for melting igneous rock, the fiber forming device comprising:
   a cooling jacket having a cylindrically shaped wall and enabled for internal fluid communication with molten igneous rock at a first end and having an outer surface shaped as a cylinder, wherein the wall is comprised of a refractory material and contains tubes supplied with cooling water;
   an induction coil circumferentially disposed around and in contact with the outer surface of the cooling jacket, the induction coil enabled to inductively impart thermal energy to the molten igneous rock;
   an orifice plate covering a second end of the cooling jacket opposite the first end, wherein the orifice plate and the second end are essentially round in shape, and wherein the orifice plate includes a plurality of nozzles enabled for forming fibers from the molten igneous rock;
   wherein the cooling jacket is enabled to cool the molten igneous rock in contact with the cooling jacket to deposit a skull layer on the cooling jacket, the skull layer providing thermal isolation between the molten igneous rock and the cooling jacket; and
   wherein the fiber forming device is enabled to achieve a uniform heat distribution of the molten Igneous rock that is shaped cylindrically by the wall.

2. The fiber forming device of claim 1, wherein the molten igneous rock comprises basalt and iron oxide.

3. The fiber forming device of claim 1, wherein the skull layer comprises an iron oxide.

4. The fiber forming device of claim 1, wherein the molten igneous rock comprises at least one of rhyolite, dacite, andesite, basalt, diabase, granite, granodiorite, diorite, and gabbro.

5. The fiber forming device of claim 1, wherein the fiber forming device is enabled to maintain a temperature variance of less than 50° C. among the plurality of nozzles after the skull layer is deposited.

6. The fiber forming device of claim 3, wherein the fiber forming device is enabled to maintain a temperature variance of less than 20° C. among the plurality of nozzles after the skull layer is deposited.

7. The fiber forming device of claim 6, wherein the fiber forming device is enabled to maintain a temperature variance of less than 10° C. among the plurality of nozzles after the skull layer is deposited.

8. The fiber forming device of claim 1, wherein the orifice plate comprises a metal or a metal ceramic.

9. The fiber forming device of claim 8, wherein the metal comprises a platinum alloy.

10. The fiber forming device of claim 9, wherein the platinum alloy comprises rhodium.

11. The fiber forming device of claim 1, wherein the induction coil is circumferentially disposed around the orifice plate.

12. The fiber forming device of claim 11, wherein the induction coil is enabled to inductively impart thermal energy to the orifice plate.

13. The fiber forming device of claim 1, wherein the induction coil is controlled by varying power and frequency.

14. A method of producing fibers from igneous rock, the method comprising:
   adding a volume of crushed igneous rock to a furnace chamber, wherein the furnace chamber is at least partially surrounded by a first induction coil;
   applying alternating current to the first induction coil to inductively impart thermal energy to the volume of crushed igneous rock to produce a homogenous rock melt;
   passing at least some of the homogenous rock melt through a fiber forming chamber, wherein the fiber forming chamber is at least partially surrounded by a second electrical induction coil, and wherein a first temperature of the homogenous rock melt in the fiber forming chamber is controlled at least in part by the second induction coil;

passing the homogenous rock melt from the fiber forming chamber to a fiber forming device, wherein the fiber forming device further comprises:

a cooling jacket having a cylindrically shaped wall and enabled for internal fluid communication with the homogenous rock melt at a first end and having an outer surface shaped as a cylinder, wherein the wall is comprised of a refractory material and contains tubes supplied with cooling water;

an orifice plate covering a second end of the cooling jacket opposite the first end, wherein the orifice plate and the second end are essentially round in sham, and wherein the orifice plate includes a plurality of nozzles enabled for forming fibers from the homogenous rock melt;

a third induction coil circumferentially disposed around and in contact with the outer surface of the water jacket and circumferentially disposed around the orifice plate, the third induction coil enabled to inductively impart thermal energy to the homogenous rock melt and the orifice plate;

wherein the cooling jacket is enabled to cool the homogenous rock melt in contact with the cooling jacket to deposit a skull layer on the cooling jacket, the skull layer providing thermal isolation between the homogenous rock melt and the cooling jacket; and wherein the cooling jacket and the induction coil are enabled to achieve a uniform heat distribution of the homogenous rock melt that Is shaped cylindrically by the wall; and passing the homogenous rock melt through the orifice plate to form fibers.

15. The method of claim 14, further comprising:
controlling a second temperature at the orifice plate to within 20° C. to 70° C. of a target temperature using the third induction coil.

16. The method of claim 14, further comprising:
controlling a second temperature at the orifice plate to within 30° C. to 60° C. of a target temperature using the third induction coil.

17. The method of claim 14, wherein the crushed igneous rock comprises basalt.

18. The method of claim 14, wherein the crushed igneous rock comprises at least one of feldspar, quartz, feldspathoid, olivine, pyroxene, amphibole, and mica.

19. The method of claim 14, wherein the crushed igneous rock comprises at least one of rhyolite, dacite, andesite, basalt, diabase, granite, granodiorite, diorite, and gabbro.

* * * * *